Sept. 9, 1952        R. E. SHETLER        2,609,643
CAM GRINDING AND MARKING FIXTURE
Filed Aug. 17, 1951
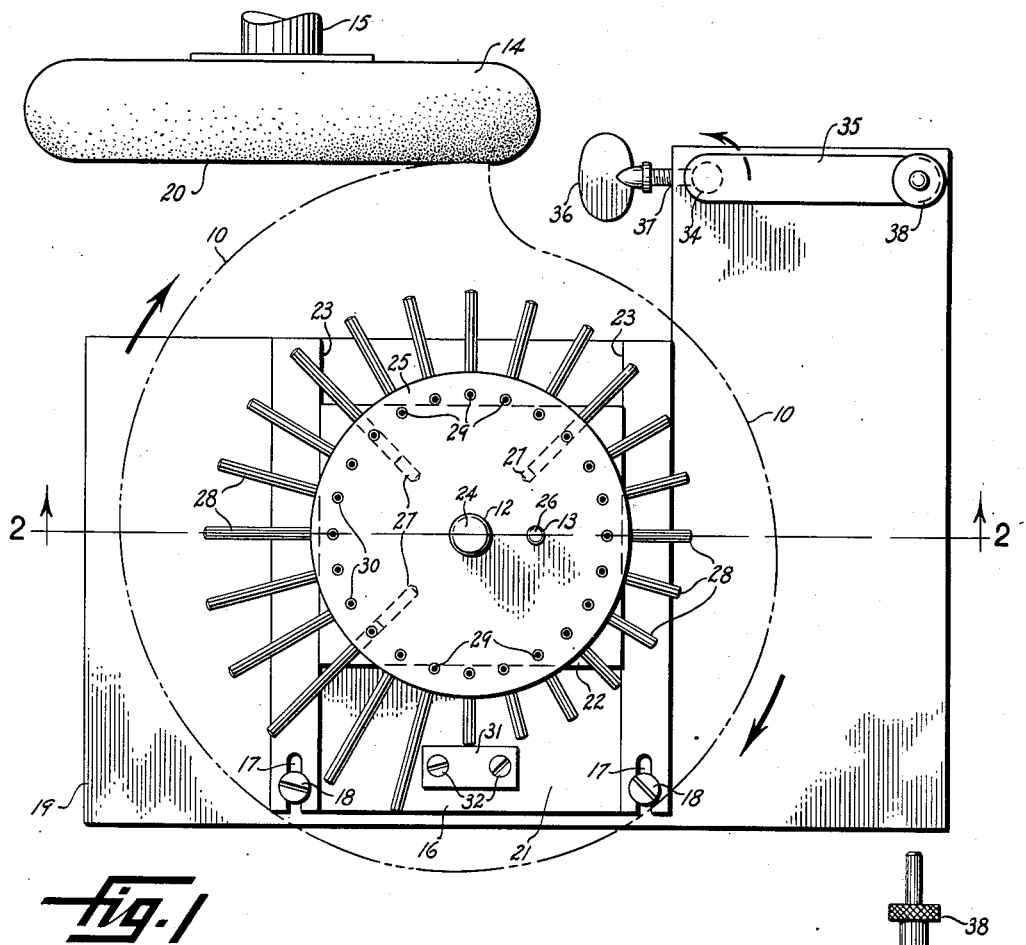
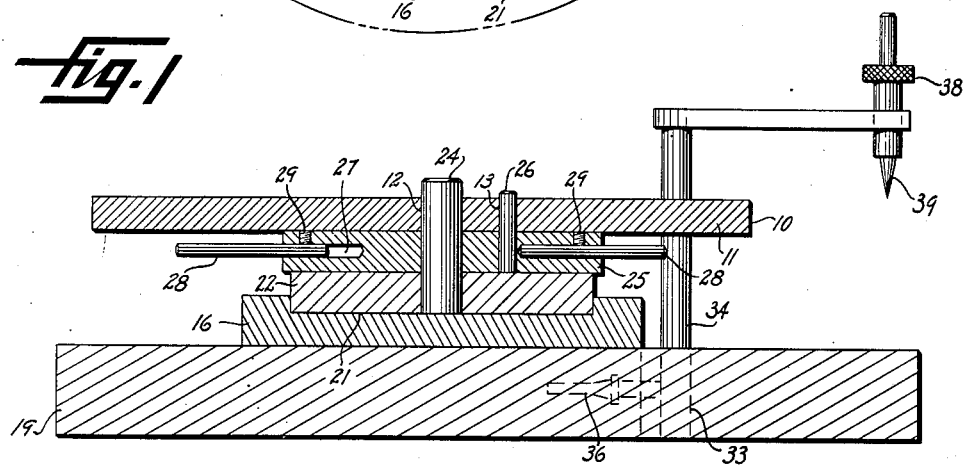
RAY E. SHETLER
INVENTOR.
BY S. Tierney Jr.
ATTORNEY Patented Sept. 9, 1952

2,609,643

UNITED STATES PATENT OFFICE 2,609,643

CAM GRINDING AND MARKING FIXTURE

Ray E. Shetler, Chula Vista, Calif., assignor to Rohr Aircraft Corporation, Chula Vista, Calif., a corporation of California Application August 17, 1951, Serial No. 242,263

8 Claims. (Cl. 51—232)

This invention relates to a fixture adapted to mark a cam outline on a workpiece and also to guide a workpiece while a cam face is ground thereon.

An object of the invention is to provide a fixture adapted for marking a cam outline of desired contour on a metallic or nonmetallic workpiece.

Another object is to provide a fixture adapted for use with an ordinary grinding wheel to grind a cam on a metallic or nonmetallic workpiece.

A further object is to provide a fixture which is readily adjustable for marking cams of widely different contours on different workpieces.

A still further object is to provide a fixture for use with a grinding wheel for grinding cams of different contours on different workpieces.

Another object is to provide a fixture of the type described in which the adjustments for cams of various contours may be easily and quickly made without the use of any special tools.

Further objects will become apparent as the description of the fixture proceeds. For a better understanding of the invention reference is made to the accompanying drawings, in which:

Figure 1 is a top view of a cam-grinding and marking fixture embodying the invention also showing a grinding wheel, and Figure 2 is a section of the fixture shown in Figure 1 taken on line 2—2 also showing a workpiece in place.

The invention is shown for marking and/or grinding a cam face 10 on a workpiece 11 which may be cast iron, steel, brass or other metal or it may be composed of hard plastic or other non-metallic material. The workpiece is provided with a central cylindrical bore 12 and a smaller cylindrical bore 13 spaced from bore 12 for a purpose to be later described. The workpiece is ground on a grinding wheel 14 fixed to the end of a shaft 15 which is rotated at a high speed by any suitable means, such as an electric motor (not shown). It will be understood that the materials of which the grinding wheel is made will be selected in accordance with the material composing the workpiece and the degree of smoothness required on the finished cam face.

The fixture comprises a support 16 along the edges of which extend two parallel slots 17 through which pass the shanks of a pair of screws 18 threaded into a fixed base plate 19 anchored in front of wheel 14. The shanks of screws 18 have a close sliding fit in slots 17 and guide support 16 in a direction normal to the front face 20 of wheel 14. Cut in support 16 is a groove 21 in which is slidable a cam supporting slide 22, the sidewalls 23 of the groove providing a guideway for guiding the slide in a direction normal to wheel face 20.

Slide 22 has secured thereto a vertical pivot pin 24 on which a cam disc 25 is supported for rotation, pin 24 also passing through bore 12 in the workpiece. Disc 25 is also provided with an indexing pin 26 which passes through bore 13 of the workpiece, thus locking the workpiece for rotation with cam disc 25. At equally spaced apart intervals around its periphery, disc 25 is provided with a plurality of radially extending bores 27 which slidingly receive hard steel cylindrical pins 28, each of which may be locked in its adjusted position by a set screw 29 threaded into a tapped hole 30 in disc 25. Near its front edge support 16 has an abutment block 31 secured thereto by a pair of screws 32 which extend into threaded holes in the support.

A vertical hole 33 is provided near the rear of base 19 to receive the supporting post 34 of a scribing or marking tool 35, which may be locked at any desired height by a thumb-screw 36 threaded into a tapped hole 37 in plate 19. Near its end tool 35 is provided with a scriber holder 38 in which the scriber 39 is adjustably mounted.

In using the fixture to mark the contour of a cam on a workpiece, holes 12 and 13 are bored in workpiece 11 and pins 28 moved in or out of holes 27 until their outer ends lie on a curve the shape of the desired cam. Each pin is locked in place after it is set by its set screw 29. In an embodiment of the invention for marking and grinding a cam of the shape illustrated, a series of 50 holes spaced 7.2 degrees apart was drilled in disc 25 and 48 of the pins 28 were utilized. Support 16 is then moved to its position furthest from the grinding wheel and screws 18 tightened. The workpiece is lowered into position, pins 24 and 26 entering the holes 12 and 13 respectively. Marking tool 35 is rotated approximately 180 degrees from its position as shown in Figure 2 and lowered until the point of its scriber 39 rests on the workpiece, then the thumbscrew 36 is tightened. The workpiece and cam disc 25 are then rotated together in the direction indicated by the arrow. As the end of each pin 28 comes into successive engagement with the face of block 31, slide 22 is gradually moved rearwardly along guideway 23 and pin 24 approaches stylus 39 causing a cam contour of gradually decreasing radius to be marked on the workpiece. After the workpiece has been marked, it is lifted from the fixture and the excess material removed by a band saw or other cutting tool, leaving a margin of from .015 to .025 inch outside the marked cam outline. The screws 18 are now loosened and support 16 moved to its extreme forward position, disc 25 rotated to the position shown in Figure 1 and the slightly oversize workpiece put in place, after having rotated marking tool 35 to the position shown in Figure 1. The operator now moves the workpiece along with support 16 and cam disc 25 towards grinding wheel 14 without rotating them, grinding away the edge of the workpiece until the high point of the cam outline previously scribed has been reached. Screws 18 are then tightened to lock support 16 in the operating position shown. The workpiece is then slowly rotated in the direction shown by the arrow, a slight pressure in a direction away from the grinding wheel being maintained on the workpiece to bring the ends of pins 28 successively into engagement with block 31. When the pin which projects furthest from disc 25 is in engagement with and normal to the face of block 31, the cam grinding is complete.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims and all changes which come within the meaning and range of equivalency of the claims are intended to be embraced therein.

Having thus described my invention, what I claim as new and useful and desire to secure by Letters Patent is:

1. A fixture adapted to rotatably support a workpiece comprising: a fixed support; a slide in engagement with said support; means for guiding said slide in a straight path; a rotatable member supported for rotation about a vertical axis by said slide, said rotatable member being adapted to receive the workpiece; a plurality of spaced apart pins projecting by different amounts from said rotatable member at spaced apart points around its periphery; a rigid member positioned for engagement by the ends of said pins in succession as said rotatable member is manually rotated; and means for preventing the workpiece from rotating with reference to said rotatable member.

2. A fixture as claimed in claim 1; in which a marking tool is supported with its end in engagement with the upper face of the workpiece to inscribe a cam curve thereon as said rotatable member is manually rotated.

3. A fixture as claimed in claim 1; in which said fixed support is provided with a vertical guideway; a marking tool having a portion slidable in said guideway and having a sharp tip; and means for securing the tool at an elevation in said guideway to cause its tip to engage the upper face of the workpiece to inscribe a cam curve thereon in response to rotation of said rotatable member.

4. A fixture as claimed in claim 1; in which said rotatable member is provided with a plurality of spaced apart openings; and the inner ends of said pins are seated in said openings.

5. A fixture adapted to advance a workpiece by a predetermined amount comprising: a support; a slide in engagement with said support; means for guiding said slide in a straight path; a member projecting vertically from said slide; an adjustable radial cam comprising a plurality of spaced apart pins, said cam being pivotally mounted on said projecting member; a rigid member mounted for engagement by said pins successively to advance the slide along said path as the cam is rotated; and indexing means for preventing the workpiece from rotating with reference to said radial cam.

6. A fixture as claimed in claim 5; in which said indexing means comprises a member projecting upward from said cam; and the workpiece is provided with an opening to receive said last named member.

7. A fixture as claimed in claim 5; in which a fixed base is provided under said support; and means is provided for securing said support at a desired position on said fixed base.

8. A fixture adapted to advance a workpiece having an aperture therein toward the face of a grinding wheel comprising, in combination: a fixed support having a groove normal to the face of the wheel in its upper face; a flat plate slidable in said groove; a vertical shaft secured to said plate and extending upwardly into said aperture; a disc pivotally mounted on said shaft, said disc being provided around its periphery with a plurality of radial openings; a plurality of pins seated in said openings; a plurality of set screws arranged to secure said pins at such positions in said openings that the outer ends of said pins lie along a cam curve of desired contour; a rigid member positioned to be engaged by the ends of said pins successively in response to the rotation of said disc; and indexing means for anchoring the workpiece at a predetermined position on said disc.

RAY E. SHETLER.

REFERENCES CITED

The following references are of record in the file of this patent:

UNITED STATES PATENTS

| Number | Name | Date |
|---|---|---|
| 1,085,381 | De Gianni | Jan. 27, 1914 |
| 1,231,920 | Lumsden | July 3, 1917 |
| 2,387,075 | Johnson | Oct. 16, 1945 |
| 2,420,547 | Lovely | May 13, 1947 |